United States Patent Office 3,312,628
Patented Apr. 4, 1967

3,312,628
URANIUM DIOXIDE-ZIRCONIUM DIOXIDE
SOL PREPARATION
Jean G. Smith, Baltimore, Md., assignor to W. R. Grace & Co., a corporation of Connecticut
No Drawing. Filed Aug. 18, 1964, Ser. No. 390,448
7 Claims. (Cl. 252—301.1)

This invention relates to uranium dioxide-zirconium dioxide sols and is specifically directed to a process for producing stable aqueous sols which contain very reactive particles of uranium dioxide-zirconium dioxide.

In summary, the process of this invention is a method for preparing a stable uranium dioxide-zirconium dioxide aquasol comprising the steps of mixing an alkaline coprecipitated uranium dioxide-zirconium dioxide containing from about 1 to 80 mole percent zirconia precipitate with water and with an acid in an amount sufficient to bring the pH of the mixture within the range of from 4.0 to 0.5, and heating the treated aqueous uranium dioxide-zirconium dioxide suspension at a temperature within the range of from 80° to 120° C. until peptization occurs.

The preferred embodiment of this invention is a method for preparing a stable uranium dioxide-zirconium dioxide sol comprising the steps of mixing an aqueous solution of a uranous salt of a monovalent acid such as uranous chloride and a zirconium salt of a monovalent acid such as zirconyl chloride or nitrate with an alkaline material which can include ammonium hydroxide solution, a water-soluble metal hydroxide, or an amine having a base constant $K_b$ of greater than $1 \times 10^{-8}$ at 25° C. to form a hydrous homogeneous uranium dioxide-zirconium dioxide precipitate; separating the precipitate from the solution and washing it, preferably by means of an alkaline solution such as weak ammonia solution followed by a water wash redispersing the washed precipitate in water to form a suspension having a solids concentration up to about 15 grams of oxide per 100 milliliters of suspension; mixing the suspension with a quantity of a soluble monovalent acid sufficient to provide a solution pH within the range of from about 4.0 to 0.5 and preferably from about 3.0 to 1.5; and heating the acid treated uranous dioxide suspension at a temperature of from about 80° to 120° C. until peptization occurs, preferably for about 1 hour at about 100° C. under reflux, whereby the precipitate is peptized and a stable, highly reactive uranium dioxide-zirconium dioxide sol is formed.

The sols produced by the process of this invention are stable and do not settle out of suspension even on prolonged standing. The dispersed phase consists of micelles which average 5 millimicrons in size and which are either solid solutions or very intimate mixtures of uranium and zirconium oxides. Because the sol or micelles are highly dispersed and are homogeneous in composition, they can be mixed with a ceramic powder such as beryllia to distribute the uranium dioxide-zirconium dioxide uniformly throughout the matrix. The resulting mixture can then be pressed, molded or otherwise shaped into the desired configuration and sintered to form a hard, rigid body. The high reactivity of the colloidal particles lowers the sintering temperature of the ceramic body and yields a product of higher final density.

The uranium dioxide-zirconium dioxide sols are also important in microsphere preparation by the sol droplet dehydration technique wherein the sol droplets are dehydrated in a hot, immiscible solvent. The uniform distribution of the oxide components in the microspheres is highly valuable. Furthermore, the sol serves as a ready medium for introducing the particles as droplets through the injection system employed. The microspheres formed from the sols produced by the method of this invention are regular spheres with a fine-grained internal structure which sinter to a high density in hydrogen.

It is an object of this invention to provide a method for producing a stable uranium dioxide-zirconium dioxide aquasol consisting of reactive particles of intimately associated uranium dioxide and zirconium dioxide.

The uranium dioxide-zirconium dioxide aquasol of this invention is obtained by peptizing freshly precipitated and washed hydrous uranium oxide-zirconium dioxide. The precipitate is obtained by mixing a solution containing soluble salts of uranium and zirconium with an excess of an alkaline reagent. Strong agitation is required to insure homogenous precipitation. The uranous salts and zirconium salts from which the aqueous solution is made are preferably the salts of a strong monovalent acid such as uranous chloride, zirconyl chloride, zirconyl nitrate, etc. Other monovalent acids such as acetic and formic acids, for example, can be employed, but the salts of strong acids are preferred. The uranous salt can be readily obtained from uranyl solutions by such means as electrolytic reduction or by reduction with hydrogen, sodium, zinc, uranium metal, hydrazine, etc. The salts in the solution can be from 1 to 80 mole percent zirconium salt. The alkaline precipitating agent can be ammonium hydroxide solution, a soluble metal hydroxide such as sodium hydroxide, an amine having a base constant $K_b$ of greater than $1 \times 10^{-8}$ at 25° C., etc. Suitable amines include methyl amine, ethyl amine, and hydrazine, for example.

The salt solution is mixed with an excess of an alkaline precipitating agent with strong agitation, and a hydrous uranium dioxide-zirconium dioxide precipitate is formed. The precipitate is then separated from the solution by filtration, for example, and is washed to remove free electrolytes. Preferably, the oxide precipitate is first washed with an alkaline solution such as a dilute ammonium hydroxide solution, and is then washed with water. The water wash is continued until the pH of the slurry formed by mixing the precipitate with water is less than 10.5.

The washed hydrous uranous dioxide-zirconium dioxide is then redispersed in water in an amount sufficient to provide a concentration up to about 15 grams of oxide per 100 milliliters of suspension. Drying of the precipitate prior to redispersion should be avoided. The redispersed precipitate is then peptized by adjusting the dispersion pH and by then heating to produce a stable sol. The reagent which is added to the suspension to adjust the pH and provide stabilizing anions is preferably a strong, monovalent acid such as hydrochloric or nitric acid. Weak monovalent acids such as acetic or formic acid can also be used, but peptization produced by the weak acid is less complete. The desired pH of the adjusted dispersion is from about 4.0 to 0.5 and is preferably from about 3.0 to 1.5. Undue lapse of time between formation of the precipitate and peptization should be avoided because peptizaion of aged precipitates is more difficult.

The acid-treated hydrous uranium dioxide-zirconium dioxide suspension is then peptized by heating it with stirring at a temperature within the range of from about 80° to 120° C. for a perod of time sufficient to produce peptization. The time required is largely dependent upon the temperature employed, lower temperatures requiring longer periods of heating. Heating times from about 5 minutes to 12 hours can be employed. Peptization is detected by routine procedures known in the iudustry, for example, by simple visual examination. Preferably the suspension is heated for about 1 hour at about 100° C. under reflux. An inert atmosphere is maintained above the suspension to limit oxidation. Mechanical agitating devices such as ultrasonic generators or a high speed shear mixer such as a "Waring Blendor" can be used to complete peptization when chemical peptization is incomplete such as when a weak acid is employed as the peptizing agent.

The product uranium dioxide-zirconium dioxide aquasol is jet black. However, the uranium dioxide component may contain excess oxygen. The uranium dioxide component, upon analysis, has been found to have oxygen contents ranging from 2.0 up to 2.4 atoms of oxygen per atom of uranium, a uranium dioxide composition up to $UO_{2.4}$. This extra oxygen is contemplated within the meaning of the term uranium dioxide and is introduced from the reaction media, from imperfect oxygen exclusion from the system with inert gas blankets, and especially from the use of oxidizing acids such as nitric acid as the peptizing agent. A major portion of the excess oxygen is believed to be interstitial and is not detrimental in the product, being removed in later processing steps such as sintering operations, for example. Storage of the aquasol under a blanket of inert gas such as nitrogen to limit contact of the sol with oxygen is preferred, however.

The aquasol concentration can be increased to greater than 20 percent by weight of the oxide by a vacuum evaporation, preferably at temperatures below about 60° C. The solids concentration in the aquasol can also be increased by centrifuging and redispersing the solids in a lesser quantity of water.

The uranium dioxide-zirconium dioxide aquasol will remain stable if maintained within the pH range of about 0.5 to 4, preferably at a pH of from about 1 to 3, and if the specific conductance is maintained within the range of about 0.5 to $1 \times 10^{-3}$ mho/cm. and preferably within the range of about 0.1 to $5 \times 10^{-3}$ mho/cm. The relative kinematic viscosity of the sol will range from about 1 to 5 with 1.0 to 2.0 being preferred.

The sol pH was measured with a Beckman Model G pH meter, and the specific conductance was measured with an Industrial Instruments' conductivity bridge, Model RC16B1. The relative viscosity $N_r$ of our sols was determined from sol density $d_s$ and the drain time of equal volumes of the sol $t_s$ and of water $t_w$ from an Ostwald viscometer according to the following equation.

$$N_r = \frac{t_s}{t_w} d_s$$

This invention is further illustrated by the following specific, but non-limiting examples.

*Example 1*

A uranous-zirconyl chloride solution was prepared from 1050 ml. of uranous chloride solution containing the equivalent of 5 g. $UO_2$ per 100 ml. and 65 ml. of a zirconyl chloride solution containing the equivalent of 20 g. $ZrO_2$ per 100 ml. This corresponds to a 35.4 mole percent $ZrO_2$ composition. The uranous chloride solution was obtained by electrodialysis of acidified uranyl chloride. The zirconyl chloride solution was obtained by dissolving the crystals. The mixed chloride solution was added dropwise to 461 ml. of a vigorously stirred 5 N ammonia solution. This volume of ammonia solution represented an excess greater than 100% over that stoichiometrically required for precipitation of the mixed oxides. Simultaneous precipitation of the two oxides was obtained.

The precipitate was washed with a 5 N ammonia solution until free of chloride ion and then with water to remove ammonia. Next, the precipitate was slurried with water to a volume of 1300 ml. The pH was adjusted to 2.0 with 55.5 ml. of 6 N hydrochloric acid and the slurry was then refluxed under nitrogen for one hour at 100° C.

The product sol was black and stable against settling and gelation. Electron micrographs showed the sol particles to be very well dispersed and to fall within the size range of 5 to 10 millimicrons. Other sol properties were as follows:

pH ---------------------------------- 1.78
Specific conductance, mho/cm. ----------- $2.51 \times 10^{-2}$
Concentration, wt. percent $UO_2$–$ZrO_2$ ----------- 4.5
Relative kinematic viscosity ------------------- 1.05

*Example 2*

The sol product of Example 1 was further concentrated by vacuum evaporation at 50° C. Properties after concentration were as follows:

pH ---------------------------------- 1.28
Specific conductance, mho/cm. ----------- $7.94 \times 10^{-2}$
Concentration, wt. percent $UO_2$–$ZrO_2$ ----------- 17.8
Relative kinematic viscosity ------------------- 1.27

There was no decrease in sol stability and no significant increase in viscosity. Electron micrographs showed no change in particle characteristics.

*Example 3*

The procedure of Example 1 was followed exactly through the precipitation and washing steps. Then, however, the washed precipitate was redispersed to a volume of 650 ml. with water, only half the volume of Example 1. After adjusting the pH to 2.0 with 20.0 ml. of 6 N hydrochloric acid, the dispersion was refluxed at 100° C. for 3 hours in a nitrogen atmosphere.

Electron micrographs showed the particles to be of the same size and type as the product of Example 1, though not as well dispersed. The dispersed phase partially settled on prolonged standing but could be readily redispersed by mild agitation. Final sol properties are tabulated below:

pH ---------------------------------- 2.2
Specific conductance, mho/cm. ----------- $1.47 \times 10^{-2}$
Concentration, wt. percent $UO_2$–$ZrO_2$ ----------- 9.9
Relative kinematic viscosity ------------------- 2.03

*Example 4*

This example illustrates the use of nitric acid as the peptizing agent.

A 1,136 ml. sample of a uranous chloride solution containing the equivalent of 10.0 g. $UO_2$/100 ml. and 140.5 ml. of a zirconyl chloride solution containing the equivalent of 20.0 g. $ZrO_2$/100 ml. were mixed. The mixture corresponded to a 35.4 mole percent $ZrO_2$ composition.

Precipitation of the mixed oxides was obtained by introducing the mixed salt solution over a period of one hour into a vigorously stirred ammonia solution (564 ml. of 7.5 N ammonia hydroxide solution).

The precipitate was filtered, was washed free of electrolyte with 4000 ml. of 3 N ammonia solution, and was then washed with 2000 ml. of deionized water. The washed precipitate was then reslurried with deionized water to a total volume of 1367 ml.

The pH of the slurry was adjusted from 10.5 with 50 ml. of 5.3 N nitric acid, and was peptized by heating under reflux and under a nitrogen blanket for one hour.

The stable, black sol produced had the following properties:

pH ---------------------------------- 1.56
Specific conductance, mho/cm. ----------- $1.51 \times 10^{-2}$
Density, g./cc. ---------------------------- 1.0932
Concentration, wt. percent $UO_2$–$ZrO_2$ --------- 9.30
Relative kinematic viscosity ---------------- 1.11

*Example 5*

In this example a sol containing 60 mole percent $ZrO_2$ was produced.

The mixed salt solution was prepared by mixing 771 ml. of a uranous chloride solution containing the equivalent of 5 g. $UO_2$/100 ml. with a 132 ml. of a zirconyl chloride solution containing the equivalent of 20 g. $ZrO_2$/100 ml. The mixed solution was then diluted with 237 ml. of deionized water.

The mixed salt solution was then slowly added to 320 ml. of vigorously stirred, concentrated ammonium hydroxide solution.

The precipitate was then separated by filtration, washed free of electrolytes with 4200 ml. of 3 N ammonium hydroxide solution, and was then washed with 3100 ml. of distilled water. The washed precipitate was then reslurried in distilled water.

The pH of the suspension was adjusted from 10.3 to 2.0 with 5.9 ml. of 6 N hydrochloric acid solution; and the sol was formed by refluxing for 2 hours under a nitrogen blanket.

The stable, black sol produced had the following properties:

pH _____ 1.54
Specific conductance, mho/cm. _____ $2.63 \times 10^{-2}$
Density, g./cc. _____ 1.064
Concentration, wt. percent $UO_2$–$ZrO_2$ (estimated)_ 5

Obviously, many modifications and variations of the invention, as herein above set forth, may be made without departing from the essence and scope thereof, and only such limitations should be applied as are indicated in the appended claims.

I claim:
1. A process for preparing a stable uranium dioxide-zirconium dioxide aquasol comprising the steps of:
   (a) mixing alkaline coprecipitated hydrous uranium dioxide-zirconium dioxide containing from about 1 to 80 mole percent zirconia with water and a quantity of a water-soluble acid having a monovalent anion sufficient to bring the pH of the mixture within the range of from about 4.0 to 0.5, and
   (b) heating the acid treated aqueous dioxide-zirconium dioxide suspension at a temperature within the range of from about 80 to 120° C. until peptization occurs.
2. The process of claim 1 wherein the heating is continued for a period of from about 5 minutes to 12 hours.
3. The process of claim 1 wherein the peptized, stable sol is concentrated by evaporation under vacuum at a temperature below 60° C.
4. A process for preparing a stable uranium dioxide-zirconium dioxide sol comprising the steps of:
   (a) mixing an aqueous solution of a uranous salt and a zirconyl salt of acid having a monovalent anion with an excess of a water-soluble alkaline reagent selected from the group consisting of ammonium hydroxide, water-soluble metal hydroxides, amines having a base constant $K_b$ of greater than $1 \times 10^{-8}$ at 25° C. and mixtures thereof,
   (b) separating the precipitate from the solution and washing it,
   (c) redispersing the washed precipitate in water to a concentration up to about 15 grams of oxide per 100 ml. of suspension and mixing the suspension with a quantity of a water-soluble acid having a monovalent anion sufficient to provide a dispersion pH within the range from about 4.0 to 0.5, and
   (d) heating the acid-treated uranium dioxide-zirconium dioxide suspension at a temperature of from about 80° to 120° C. until peptization occurs.
5. The process of claim 4 wherein the redispersed oxide suspension is mixed with an amount of the acid sufficient to provide a dispersion pH within the range of from about 3.0 to 1.5.
6. The process of claim 4 wherein the acid-treated oxide suspension is heated for a period of from 5 minutes to 12 hours.
7. The process of claim 4 wherein the acid-treated oxide suspension is heated for about 1 hour at a temperature of about 100° C. under reflux in an inert atmosphere.

References Cited by the Examiner
UNITED STATES PATENTS

| | | | |
|---|---|---|---|
| 2,798,049 | 7/1957 | White et al. | 252—301.1 |
| 2,984,628 | 5/1961 | Alexander et al. | |
| 3,024,199 | 3/1962 | Pasfield | 252—301.1 |
| 3,150,100 | 9/1964 | Fitch et al. | 252—301.1 |
| 3,186,949 | 6/1965 | Fitch et al. | 252—301.1 |
| 3,238,057 | 3/1966 | Fitch et al. | 252—301.1 X |
| 3,265,626 | 8/1966 | Fitch et al. | 252—301.1 |

CARL D. QUARFORTH, *Primary Examiner.*

BENJAMIN R. PADGETT, *Examiner.*

S. J. LECHERT, JR., *Assistant Examiner.*